US012365157B2

(12) United States Patent
Dzick et al.

(10) Patent No.: US 12,365,157 B2
(45) Date of Patent: Jul. 22, 2025

(54) METHOD FOR PRODUCING A MOULD SEGMENT OF A VULCANIZING MOULD, MOULD SEGMENT, AND VULCANIZING MOULD

(71) Applicant: Continental Reifen Deutschland GmbH, Hannover (DE)

(72) Inventors: Jürgen Dzick, Seelze (DE); Nicholas Hoppe, Wunstorf (DE); Bert Voelker, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 67 days.

(21) Appl. No.: 17/904,084

(22) PCT Filed: Dec. 3, 2020

(86) PCT No.: PCT/EP2020/084446
§ 371 (c)(1),
(2) Date: Aug. 11, 2022

(87) PCT Pub. No.: WO2021/160314
PCT Pub. Date: Aug. 19, 2021

(65) Prior Publication Data
US 2023/0064330 A1 Mar. 2, 2023

(30) Foreign Application Priority Data
Feb. 11, 2020 (DE) .................... 10 2020 201 682.8

(51) Int. Cl.
*B29D 30/06* (2006.01)
*B29C 33/38* (2006.01)
(Continued)

(52) U.S. Cl.
CPC ...... *B29D 30/0606* (2013.01); *B29C 33/3842* (2013.01); *B33Y 80/00* (2014.12);
(Continued)

(58) Field of Classification Search
CPC ........ B29D 30/0606; B29D 2030/0609; B29D 2030/0612; B29D 2030/0613;
(Continued)

(56) References Cited

U.S. PATENT DOCUMENTS

2015/0165706 A1* 6/2015 Gaebelein .......... B29D 30/0629
264/293
2016/0016371 A1 1/2016 Sasaki
(Continued)

FOREIGN PATENT DOCUMENTS

DE 102012102322 A1 9/2013
DE 102018204024 A1 9/2019
(Continued)

OTHER PUBLICATIONS

Japanese Office Action dated Mar. 23, 2023 corresponding to Japanese Application No. 2022-542263.
(Continued)

*Primary Examiner* — Rebecca Janssen
(74) *Attorney, Agent, or Firm* — Richard A. Wolf; Gregory Adams

(57) ABSTRACT

A method for producing a mold segment of a vulcanizing mold for a pneumatic vehicle tire for forming the profiling of a tread, having a metallic base part (6) with a mold side with ribs (3) which form channels encircling or delimiting profile elements.

Figure 1:
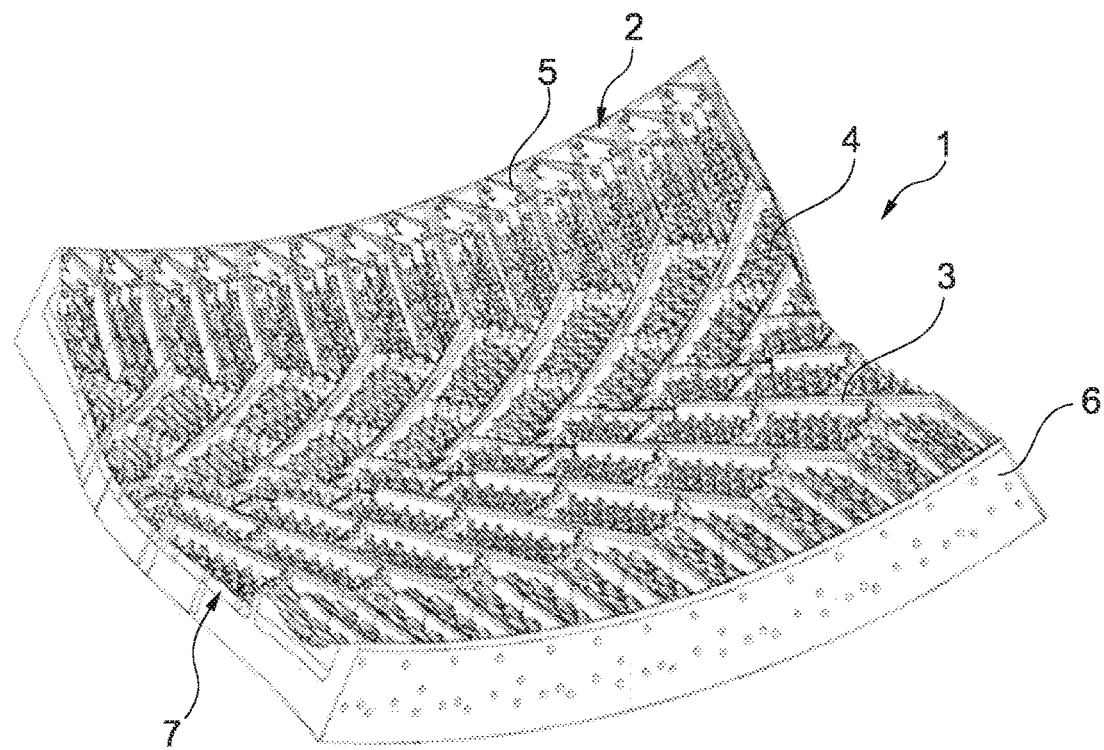

A rib skeleton (8) consisting of ribs (8'), the arrangement and the profile of which at least partially corresponds to the arrangement and the profile of ribs (3) forming channels, is milled from the base part (6), inserts (7) with peripheral frame parts (7b) are built up by means of an additive method, (Continued)

the inserts (7) being inserted into the rib skeleton (8) and the frame parts (7b) completing the ribs (8') of the rib skeleton (8) to form the ribs (3) forming the channels.

14 Claims, 3 Drawing Sheets

(51) Int. Cl.
  *B33Y 10/00* (2015.01)
  *B33Y 80/00* (2015.01)
  *B22F 10/28* (2021.01)

(52) U.S. Cl.
  CPC ...... *B22F 10/28* (2021.01); *B29D 2030/0609* (2013.01); *B29D 2030/0612* (2013.01); *B29D 2030/0613* (2013.01); *B29K 2905/00* (2013.01); *B33Y 10/00* (2014.12)

(58) Field of Classification Search
  CPC ..... B29C 33/3842; B33Y 80/00; B33Y 10/00; B22F 10/28; B29K 2905/00
  See application file for complete search history.

(56) References Cited

U.S. PATENT DOCUMENTS

| | | |
|---|---|---|
| 2016/0039160 A1 | 2/2016 | Calvel et al. |
| 2017/0216922 A1 | 8/2017 | Desvignes et al. |
| 2020/0130302 A1 | 4/2020 | Maeda |
| 2021/0016530 A1 | 1/2021 | Novotny et al. |

FOREIGN PATENT DOCUMENTS

| | | |
|---|---|---|
| EP | 2987630 A1 | 2/2016 |
| JP | 5579292 B1 | 8/2014 |
| JP | 2018086812 A | 6/2018 |

OTHER PUBLICATIONS

Chinese Office Action dated May 8, 2023 corresponding to Chinese Application No. 202080095634.3.
European Search Report dated Oct. 19, 2023 corresponding to European Application No. 20819722.8.
International Search Report dated Mar. 10, 2021 of International Application PCT/EP2020/084446 on which this application is based.
Office Action dated Jul. 31, 2024 of counterpart Korean application No. 10-2022-7026751.

* cited by examiner

METHOD FOR PRODUCING A MOULD SEGMENT OF A VULCANIZING MOULD, MOULD SEGMENT, AND VULCANIZING MOULD

The invention relates to a method for producing a mold segment of a vulcanizing mold for a pneumatic vehicle tire for forming the profiling of the tread, having a metallic base part with a mold side with ribs which form channels encircling or delimiting profile blocks. The invention furthermore relates to a mold segment of a vulcanizing mold for a pneumatic vehicle tire for forming the profiling of the tread of the pneumatic vehicle tire, having a metallic base part and having ribs for forming channels which encircle or delimit profile blocks. Furthermore, the invention relates to a vulcanizing mold consisting of mold segments.

Pneumatic vehicle tires are vulcanized in heating presses, in which a green tire is inserted into a vulcanizing mold and vulcanized under the action of pressure and temperature. The tread of the tire is shaped and heated here by means of a mold segment ring consisting of a plurality of mold segments, the tread profile also being formed since the mold segments are provided with mold elements, such as ribs and lamellae, on their mold sides facing the mold cavity. Traditionally, mold segment rings are manufactured from steel alloys or aluminum alloys by casting methods with subsequent machining or by machining only.

In addition, it is known to produce those parts of mold segments that form the profiling in the tread by means of an additive production method, in particular by SLM (selective laser melting) and to fasten them to a traditionally manufactured further mold segment base part. A mold segment produced in this way is known, for example, from US 2016/039160 A1.

It is also known to produce individual mold elements, for example lamellae, which form sipes in the tread, or ribs, which form channels in the tread, by additive manufacturing methods. DE 10 2012 102 322 A1 discloses a method for producing a vulcanizing mold for pneumatic vehicle tires, in which the lamellae are produced by means of SLM, while segment base parts are produced by a casting method or a machining method and the lamellae are subsequently introduced. It is also known from EP 2 987 630 A1 to produce at least one mold segment base part together with the negative profile elements by SLM.

In the known methods for producing mold segments, in which the complete mold segment is produced by an additive method or which uses a segment part, which is made of steel, for example, and which is connected to a second segment part, which is built up together with the shaping elements, such as ribs or lamellae, by an additive method, large-volume parts are to be built up using the additive method. The production is thus time-consuming and requires large installations. Use is made here of multi-laser systems which work in parallel on a component and have to be precisely matched to one another in order to obtain a component of satisfactory quality. The subsequent milling effort required to provide a satisfactory mold segment is considerable. In addition, large-volume components produced using an additive method tend to warp as a result of internal stresses that occur, which necessitates special manufacturing methods, such as the sintering of a lattice structure inside the component. Of particular advantage in the case of mold segment parts produced by an additive method such as selective laser melting is the possibility of producing mold parts with a complex design, in particular mold parts with a large number of lamellae. Such mold parts are therefore of great interest for vulcanizing molds for vulcanizing winter tires and Nordic tires.

The problem addressed by the invention is that of providing hybrid mold segments—mold segments with constituent parts not manufactured by additive methods in combination with constituent parts manufactured by additive methods—in a novel and innovative way that do not have the above disadvantages, wherein it is sought to fully maintain the advantages of additive methods.

According to the invention, the stated problem is solved by means of a method in which a rib skeleton consisting of ribs, the profile of which at least partially corresponds to the arrangement and the profile of ribs forming channels, is milled from the base part, inserts with peripheral frame parts are built up by means of an additive method, the inserts being inserted into the rib skeleton and the frame parts completing the ribs of the rib skeleton to form the ribs forming the channels.

The stated problem is furthermore solved by means of a mold segment in which the base part has a milled-out rib skeleton consisting of ribs, the arrangement and the profile of which at least partially corresponds to the arrangement and the profile of ribs forming channels, into which rib skeleton inserts produced by an additive method and having peripheral frame parts are inserted, said frame parts completing the ribs of the rib skeleton to form ribs forming channels.

In the case of the invention, those elements or constituent parts of the shaping part of the mold segments that require a particularly precise configuration are therefore produced by an additive method. The inserts are small components that can be printed inexpensively without distortion and internal stresses in small systems, each insert with a laser. The difficulties associated with the use of multi-lasers are therefore eliminated. The base part is in particular a part which is premanufactured from a steel alloy or aluminum alloy customary for mold segments and on which the rib skeleton is produced by milling, the milled base part having a high degree of dimensional accuracy, since the rib skeleton can be milled out particularly precisely. The rib skeleton is above all also particularly advantageous because it allows the inserts to be built up with a small additive portion of material, since the rib skeleton already contains some of the ribs provided. Furthermore, the material of the base part can correspond to the material from which the metal powder for building up the inserts is composed, and therefore the constituent parts of the mold segment have the same material expansion. The outlay on printing for producing the inserts is substantially less than for printing large-volume mold segment parts according to the prior art, and therefore less time and less material are required, resulting in significantly lower costs. The invention also provides a modular concept for mold segments of tire vulcanizing molds, since the inserts can be exchanged, and no exchange of large constituent parts of the mold segments or even of the mold segments themselves is required if, for example, different rib designs or surface structures within the scope of the development of treads are intended to be tested with vulcanized tires on vehicles in use.

The method is particularly advantageous if the inserts are built up additively together with lamellae and/or micro-lamellae. Particularly complex lamellae and micro-lamellae can be printed particularly precisely and with almost any small spacings. The method is therefore particularly advantageous for the production of mold segments for the profiling of winter or Nordic tires.

Inserts which are preferably built up additively together with inner layers on a building plate, are cut out of the building plate together with the building plate part, on which they are built, such that the building plate parts partly form or form bottom plates of the inserts, are particularly dimensionally stable. The building plate parts are therefore constituent parts of the inserts and, if inner layers are also built up additively, form the inserts together with these bottom plates. The inner layers form the mold surfaces which form the positive surfaces of the tread of the tire.

In an alternative embodiment, the inserts together with inner layers are built up additively on a building plate, the inserts then being separated from the building plate, such that the inner layers form bottom plates of the inserts. The inner layers, together with the frame parts provided, ensure the stability of the inserts for their handling when being installed in and possibly removed from the base part.

In a further alternative, the inserts, preferably together with inner layers, are built up additively on building plate parts which are adapted to the inserts, in particular are cut to size from a building plate. Dimensionally stable inserts are also obtained in this variant.

According to a preferred refinement, the inner layers can be built up additively with at least one surface structure. The inner layers of inserts can have different structures such that these inner layers consist of differently structured partial regions, and/or inserts can be built up, the inner layers of which have structures that differ from the structures of the inner layers of other inserts.

The mold segment therefore preferably has inserted inserts having bottom plates, each of which consists of an additively built up inner layer or of an additively built up inner layer and a part of the building plate on which the inserts have been built up. The tread of the tire to be vulcanized obtains the intended curved outer contour by means of the inner layers which have curved outer surfaces which are the mold surfaces for forming the positive surfaces of the profile elements of the tread.

In a further preferred embodiment, inserts which are subdivided or divided by additional ribs are built up additively. The building up of such inserts is appropriate, for example, when ribs are provided which are intended to form blind grooves in the tread. This embodiment is also advantageous if in particular relatively narrow ribs are provided which form channels, for example, which subdivide profile blocks into smaller profile block elements. Inserts of this type can also be inserts that are used at mold segment boundaries and, for example, additionally have part of a second insert "divided" by the mold segment boundary.

The mold segment is therefore preferably provided with inserts which are additionally subdivided or divided by ribs and optionally provided with micro-lamellae for the formation of correspondingly narrow and shallow sipes in the tread of the tire to be vulcanized.

In a further preferred embodiment, inserts which have sections of a shoulder decoration or of shoulder decoration ribs are built up additively. This embodiment is considered in particular when relatively complex decorative elements and the like are intended to be realized.

In an alternative embodiment of the method, shoulder decoration ribs with surface decorative elements are milled out on the base part. As is known, shoulder decoration ribs form those regions of the tread of the tire to be vulcanized which are already outside the ground-contacting part of the tread and follow the shoulder curvature of the tire. Depending on the design, the shoulder decoration ribs can be created precisely and inexpensively by milling. Inserts which, as mentioned, are built up additively with sections of shoulder decoration ribs may require a greater outlay and higher production costs. The mold segment therefore has either a base part with milled shoulder decoration ribs with decorative elements milled on the surface, or inserts which have sections of a shoulder decoration or shoulder decoration ribs.

At the positioning positions of the inserts on the base part, depressions with flat bottom surfaces are preferably milled out between the ribs of the rib skeleton, the orientation of which depressions on the base part is adapted to the intended outer contour of the tread of the tire to be vulcanized, the depressions also being milled to a depth adapted to the thickness of the bottom plates of the inserts.

The mold segment therefore preferably has a correspondingly designed base part which has depressions with flat bottom surfaces between the ribs of the rib skeleton and between the ribs and the shoulder decoration ribs.

In order to ensure the necessary mold ventilation when molding the tire to be vulcanized into the vulcanization mold, in a preferred embodiment, ventilation holes which reach into the bottom surfaces of the depressions are made in the base part, and the building plate is provided with ventilation holes, the positions of which correlate with the positions of the ventilation holes in the base part. Threaded bores can already be created in the building plate if the inserts are to be screwed to the base plate. Thus, the base part of the mold segment has ventilation holes reaching into the bottom surfaces of the depressions, and the bottom plates of the inserts are preferably penetrated by ventilation holes, the positions of which correlate with the positions of the ventilation holes in the base part.

The inner layers of the inserts are therefore preferably also built up leaving holes free, the positions of which correspond to the positions of the ventilation holes in the building plate.

The milling work on the base part is simplified if, according to a preferred embodiment, this is carried out in such a way that the depressions in the base part are milled with rounded corner regions. The inserts to be built up according to the additive method can then be built up additively in a particularly precise manner with correspondingly rounded outer corner regions and also with sharp-edged inner corners. Accordingly, the preferred design of the base part is also provided with depressions with rounded corner regions, the inserts having correspondingly rounded outer corner regions and, if desired, sharp-edged inner corners.

It is particularly advantageous if the base part of the mold segment consists of a steel alloy or of an aluminum alloy since such materials can be milled particularly well.

Figure 2:
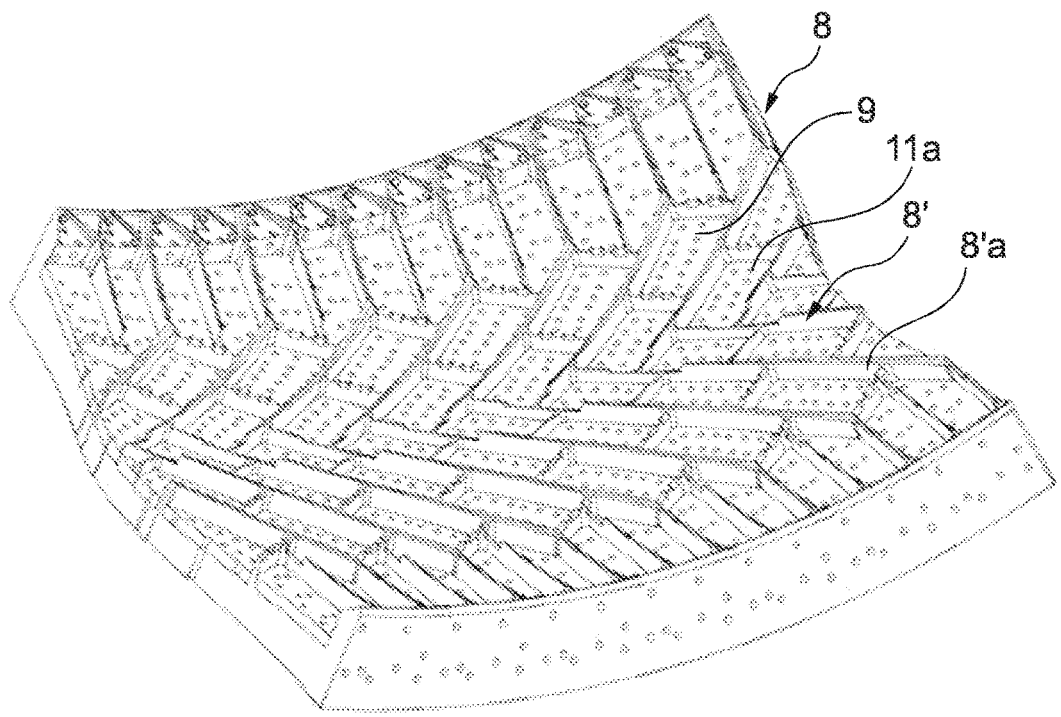
Figure 3:
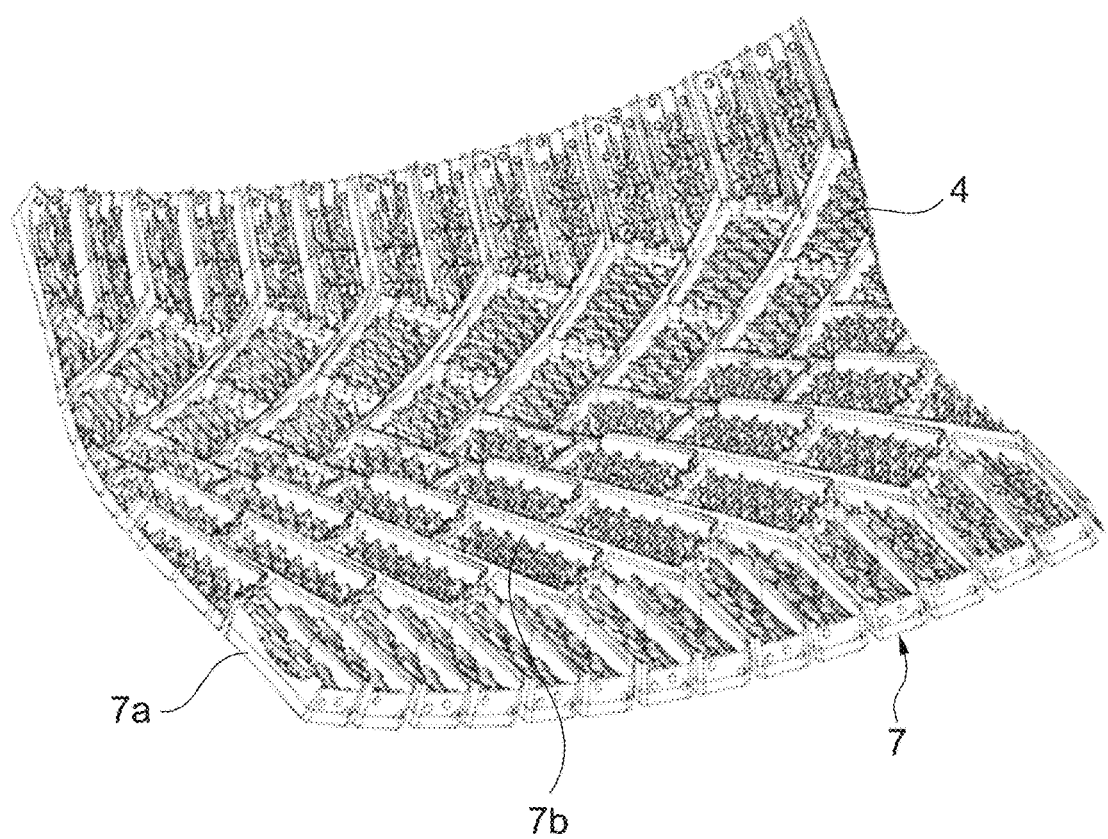
Figure 4:
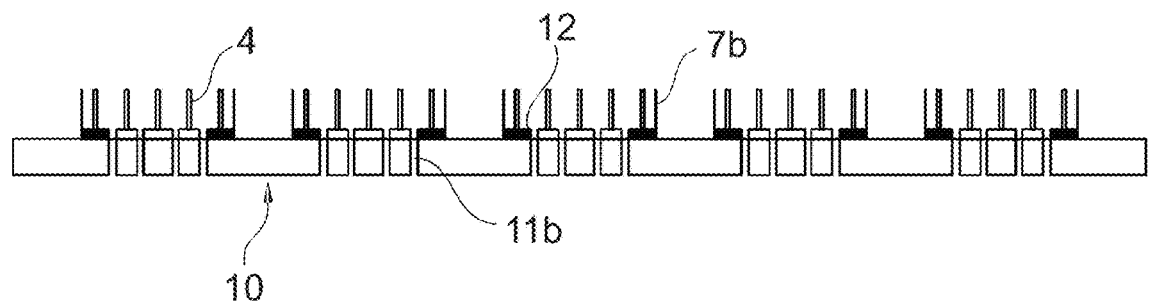
Figure 5:
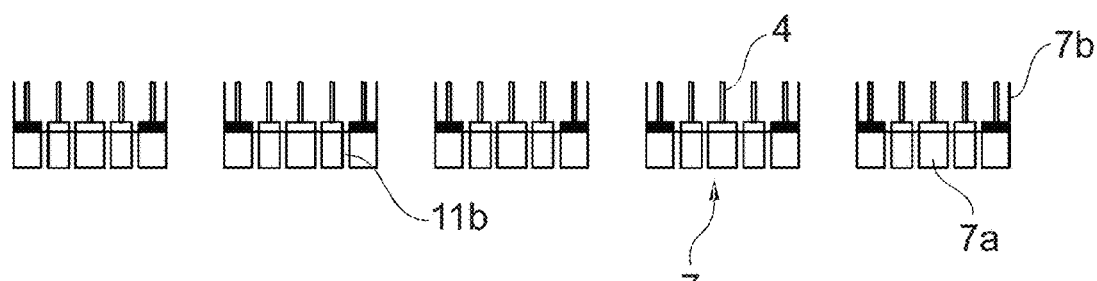
Figure 6:
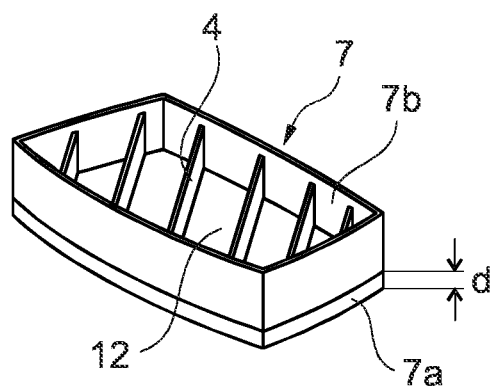
Figure 7:
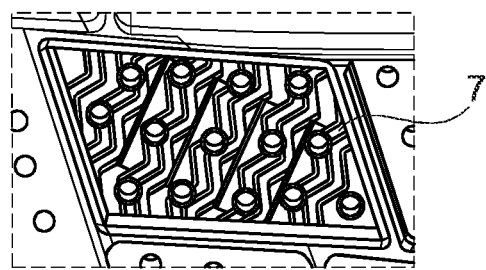

Further features, advantages and details of the invention will now be described in more detail with reference to the partially schematic drawing, which illustrates exemplary embodiments. In the drawing:

FIG. 1 shows a view of a mold segment part of a tire vulcanizing mold consisting of a base part together with inserted inserts, FIG. 2 shows a view of the associated base part, FIG. 3 shows a view of the associated inserts, FIG. 4 shows a schematic view of a building plate with built-up inserts, FIG. 5 shows a schematic view of inserts cut out of the building plate, FIG. 6 shows a schematic view of an individual insert, and FIG. 7 shows a view of a detail of an insert inserted into a base part.

In the description below, "radial direction" is understood as meaning the direction of a perpendicular to the mold surface forming the tread outer surface. "Axial direction" is understood as meaning a direction parallel to the axis of rotation of the tire to be vulcanized.

FIG. 1 shows a view of a mold segment part 1 of a mold segment of a segment ring of a tire vulcanizing mold, wherein in particular the inner side—the side facing the mold cavity—can be seen. A conventional segment ring is composed, for example, of seven to fourteen mold segments, each of which has a mold segment spine opposite the inner side, by means of which the mold segments are arranged in a manner known per se on a segment shoe of the tire vulcanizing mold. On its inner side, the mold segment part 1 has mold elements which, according to the profiling provided in the tread of the tire to be vulcanized, are profile negative elements, ribs 3 and lamellae 4 in the embodiment shown.

The rear sides of the mold segment parts 1 are, for example, simple cylindrical surfaces, and therefore the mold segment parts 1 are attached to the segment shoe of the vulcanizing mold by means of appropriately designed adapters. Use is made in particular of adapters which are screwed onto the rear sides of the mold segment parts 1 or are connected to the mold segment parts 1 via tongue and groove or dovetail connections or other positive or materially bonded connections. In an alternative embodiment, the mold segment parts 1 themselves are already designed as an interface to the container of the vulcanizing mold.

The lamellae 7 form sipes in the tread of the tire to be vulcanized with a width (on the tread periphery in a new tire) of the order of magnitude of 0.4 mm to 1.0 mm, the ribs 3 form channels in the tread of the tire to be vulcanized, the width of which (on the tread periphery in a new tire) is greater than 1.0 mm and in particular up to 6.0 mm. In addition, it is possible to provide lamellae which are what are referred to as micro-lamellae, which usually form narrow and shallow sipes with a width and depth of about 0.2 mm to 0.3 mm in the tread. In the embodiment shown in FIG. 1, the ribs 3 and lamellae 4 form a typical winter tire profile in the tread of the tire to be vulcanized. In the example, a large number of V-shaped ribs 3 running parallel to one another and across the width of the inner side of each mold segment part 1 are also provided, and there are also further ribs 3 running obliquely to the circumferential direction of the mold segment 1 and subdividing the V-shaped ribs 3. On the shoulder side, there is an additional division by means of ribs 3 which are present centrally between and parallel to the sections of the V-shaped ribs 3 running on the shoulder side. Shoulder decoration ribs 2 form the lateral edges of the mold segment part 1. In all of the surface elements encircling the ribs 3 and the shoulder decoration ribs 2 there is in each case a number of lamellae 4 in wave form. Flat structures in the form of decorative elements 5 for forming shoulder decorations of the tire are located on the upper side of the shoulder decoration ribs 2—the side of the mold segment part 1 facing the mold cavity. Owing to the V-shaped ribs 3 between the shoulder decoration ribs 2, the profile negative which is formed is divided into pitches running in a V-shaped manner relative to one another—negative sections that are repeated in the same way in the circumferential direction in each half of the mold segment part.

As shown in FIG. 2 and FIG. 3, the mold segment part 1 is composed of a base part 6 made of a metallic material, in particular of a steel alloy or an aluminum alloy, and also of a multiplicity of inserts 7 inserted into the base part 6. The inserts 7, the production of which will be described in more detail further below, each have a bottom plate 7a (FIG. 6) which has a flat underside and an inner side formed in accordance with the outer surface of the blocks to be formed in the tread of the tire to be vulcanized. The bottom plates 7a have a thickness d, which is slightly larger at the periphery than in the center. The inner sides of the bottom plates 7a therefore form the mold surfaces for forming the outer surfaces of the tread that come into contact with the underlying surface.

The design of the base part 6 will now be explained in more detail with reference to FIG. 2. The base part 6 is a milled part with milled shoulder decoration ribs 2 with milled decorative elements 5 on the lateral edges and a milled rib skeleton 8. The rib skeleton 8 consists of ribs 8', the arrangement and the profile of which corresponds to the arrangement and the profile of the ribs 6, although the ribs 8' are narrower than the ribs 6, and flank sections of the ribs 6 are missing on both rib flanks 8'a. As will be described later, these flank sections are supplemented by frame parts 7b of the inserts 7. According to a preferred embodiment, the rib flanks 8'a are, as shown in FIG. 2, flat surfaces which are oriented in the radial direction. In principle, the rib flanks 8'a are milled in such a way that a flush insertion of the inserts 7 mentioned from above is possible; the rib flanks 8'a can therefore be slightly inclined relative to the radial direction, for example.

The level of the tips of the ribs 8' corresponds to that of the ribs 3. However, the ribs 8' have a greater height than the ribs 3, since the ribs 8' of the rib skeleton 8, on the shoulder side together with the shoulder decoration ribs 2, enclose deeper milled-out depressions with flat bottom surfaces 9. The depth of the depressions is adapted to the greatest thickness d of the bottom plates 7a of the inserts 7 in such a way that, when the inserts 7 are inserted, the inner sides of the inserts 7 forming the mold surface are located at the intended mold surface level.

The orientation of the bottom surfaces 9 is adapted to the desired rounding or contour of the outer side of the tread of the tire to be vulcanized, preferably by each bottom surface 9 being aligned at right angles to a straight line oriented in the radial direction, with respect to the outer contour mentioned, through the geometric center point thereof. The bottom surfaces 9, which are oriented virtually in the axial direction, are therefore located in the central region of the base part 6.

The decorative elements 5 on the shoulder decoration ribs 2 have, for example and as shown in FIG. 1 and FIG. 2, flat and narrow elevations which continue the ribs 8' of the rib skeleton 8.

For ventilation, the base part 6 is pierced between the bottom surfaces 9 and its rear side, with either in each case a larger number of holes 11a being created per bottom surface 9 (FIG. 2) or only one or two holes 11a being created for ventilation, and a type of channel network of flat depressions, connected to the hole 11a or the holes 11a, being milled on the respective bottom surface 9. The holes 11a are arranged in such a way that their positions do not coincide with the positions of the lamellae 4 in the inserts 7.

The inserts 7 are built up in a larger number on a building plate 10 by an additive method, in particular by selective laser melting. The building plate 10 is a flat plate, and, in a preferred embodiment, the thickness of the plate also determines the required depth of the mentioned depressions in the base part 6. The building plate 10 is first also provided with holes 11b (FIG. 4 and FIG. 5) corresponding to the arrangement of the holes 11a in the base part 6. Depressions in the form of channel networks, which correspond to the milled channel networks that may be provided on the bottom surfaces 9, may be formed, but this is not absolutely necessary, since the milled channel networks on the bottom surfaces 9 usually already ensure good ventilation.

The building plate 10 is aligned and positioned accordingly in a 3D printer, and the holes 11b created are filled with metal powder or the like flush with the upper side of the building plate 10. The individual inserts 7 are then built up layer by layer in their intended designs, together with the provided lamellae, any micro-lamellae, other surface structures, optionally letters, treadwear indicators, etc. Ventilation holes are left free at the positions of the holes 11b in the building plate 10. A thin inner layer 12 (FIG. 4) is preferably built up on the upper side of the building plate in a curved manner corresponding to the intended curvature of the mold surface. The inserts 7 are also built up with peripheral frame parts 7b (FIG. 6), which are designed in such a way that, when the inserts 7 are inserted at their intended positions on the base part 6, the ribs 8' of the rib skeleton 8 are supplemented to form complete ribs 3. In the case of inserts 7 that are to be positioned on the shoulder side, frame parts 7b are formed only on those three sides that border ribs 8'. Depending on the actual design of the tread profile with ribs, associated inserts that shape the profiling can also only have frame parts on two sides and/or be designed in such a way that they form larger profile blocks, more than one profile block or other block-like structures in the tread.

In a preferred embodiment, the built-up inserts 7 together with the building plate part, on which they are directly built up, are cut out of the building plate 10, for example by means of a laser beam, water jet or mechanically. The mating surfaces are reworked if necessary. At this point, ventilation valves, if provided, can be inserted in the holes 11b penetrating the building plate 10 and the inner layer 12. The bottom plates 7a of such inserts 7 consist of the building plate part and the inner layer 12. In an alternative embodiment, the inserts 7 are separated along the upper side of the building plate 19, for example are cut off, such that the bottom plates 7a are formed by the inner layers 12. The milling depth of the depressions in the base part 6 depends on the intended design.

The positioning and insertion of the inserts 7 at their positions on the base part 6 subsequently takes place. The inserts 7 are fixedly connected to the base part 6, preferably by shrinking, by the base part 6 being heated before insertion. The inserts 7 can also be connected to the base part 6 by screwing or welding. In an embodiment with building plate parts as constituent parts of the bottom plates 7b of the inserts 7, screw holes with internal threads can be created in the building plate and the base part, such that inserts 7 can be easily exchanged.

Milling out the depressions in the base part 6 with sharp-edged corners is expensive. The corner regions of the depressions are therefore preferably milled in a rounded manner. The corner regions between the frame parts 7b on the inserts 7 are built up in rounded form on the outer side, corresponding to the rounded corner regions of the depressions, during the additive building-up method, and the inner corners between the frame parts 7b are built up with sharp edges, as shown in FIG. 7.

In particular, the mold segment division takes place in such a way that complete inserts can be used. Alternatively, there is a "division" of inserts in the data for the additive building-up method, such that inserts are additively built up in two parts.

Furthermore, inserts 7 themselves can additionally have ribs which, for example, subdivide these inserts 7 or divide them into insert elements. The rib skeleton 8 can have ribs which are interrupted in their profile and which supplement frame parts of the inserts.

The additive building up of the inserts takes place fully automatically with software control, as does the milling work on the base parts 6.

LIST OF REFERENCE SIGNS

1 . . . Mold segment
2 . . . Shoulder decoration rib
3 . . . Rib
4 . . . Lamella
5 . . . Decorative elements
6 . . . Base part
7 . . . Insert
7a . . . Bottom plate
7b . . . Frame part
8 . . . Rib skeleton
8' . . . Rib
8'a . . . Rib flank
9 . . . Bottom surface
10 . . . Building plate
11a, 11b . . . Hole
12 . . . Inner layer
d . . . Thickness

The invention claimed is:

1. A method for producing a mold segment of a vulcanizing mold for a pneumatic vehicle tire, the mold segment being configured to form the profiling of a tread of the tire, the method comprising:
providing a metallic base part having a mold side;
milling a rib skeleton into the mold side of the base part, the rib skeleton comprising ribs arranged and profiled so as to correspond with channels of the profiling of the tread in which said channels encircle or delimit profile elements of the profiling of the tread;
building inserts with frame parts using an additive manufacturing process; and
inserting the inserts into the rib skeleton, wherein the ribs of the rib skeleton in combination with the peripheral frame parts of the inserts form overall ribs that define the channels encircling or delimiting the profile elements of the profiling of the tread.

2. The method of claim 1, wherein the building of the inserts includes building lamellae and/or micro-lamellae within the peripheral frame parts by using additive manufacturing.

3. The method of claim 1, wherein the inserts are built on a building plate and subsequently cut out of the building plate to form bottom plates of the inserts.

4. The method of claim 1, wherein the inserts are built with inner layers that form bottom plates of the inserts during the additive manufacturing process.

5. The method of claim 4, wherein the inserts are built on a building plate and the forming the bottom plates includes cutting the inner layers from the building plate after the additive manufacturing process.

6. The method of claim 5, wherein the inserts comprise at least one surface structure configured to define profile details of the profiling of the tread.

7. The method of claim 1, further comprising additively building shoulder decoration ribs as part of the inserts.

8. The method of claim 1, further comprising milling out the base part to form shoulder decoration ribs on the mold side.

9. The method of claim 1, further comprising milling out the base part between the ribs of the rib skeleton to correspond to an intended outer contour of the tire tread.

10. The method of claim 9, further comprising making ventilation holes in the base part.

11. The method of claim 10, further comprising providing a building plate with ventilation holes aligned to the ventilation holes in the base part.

12. The method of claim 1, wherein the inserts are built up-leaving holes free that correspond to ventilation holes in a building plate.

13. The method of claim 1, wherein depressions in the base part are milled with rounded corner regions, the inserts being built up with correspondingly rounded outer corner regions.

14. The method of claim 1, wherein the ribs of the rib skeleton define enclosed pockets of the base part, and the inserts are nested within the enclosed pockets in such a way that the ribs of the rib skeleton cooperate with the peripheral frame parts of the inserts to form the overall ribs.

\* \* \* \* \*